US009550373B2

(12) United States Patent
Kawai

(10) Patent No.: US 9,550,373 B2
(45) Date of Patent: Jan. 24, 2017

(54) DATA CREATION DEVICE AND COMPUTER-READABLE MEDIUM STORING DATA CREATION PROGRAM

(71) Applicant: Brother Kogyo Kabushiki Kaisha, Nagoya-shi, Aichi-ken (JP)

(72) Inventor: Junya Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 395 days.

(21) Appl. No.: 14/219,503

(22) Filed: Mar. 19, 2014

(65) Prior Publication Data

US 2014/0310485 A1 Oct. 16, 2014

(30) Foreign Application Priority Data

Apr. 10, 2013 (JP) ................................ 2013-082518

(51) Int. Cl.
*G06F 12/06* (2006.01)
*B41J 3/407* (2006.01)

(52) U.S. Cl.
CPC .................................. *B41J 3/4075* (2013.01)

(58) Field of Classification Search
CPC ..................................................... B41J 3/4075
See application file for complete search history.

(56) References Cited

U.S. PATENT DOCUMENTS 4,028,680 A * 6/1977 Vittorelli .................... B41J 3/50 400/17
4,839,742 A * 6/1989 Nakatani .................... B41J 3/36 347/171
6,487,457 B1 * 11/2002 Hull ........................ G05B 15/02 700/17
6,490,604 B1 * 12/2002 Toyosawa .............. B41J 3/4075 715/209
7,038,794 B2 * 5/2006 Kurashina .............. B41J 3/4075 358/1.11
7,114,865 B2 * 10/2006 Ishii ....................... B41J 3/4075 400/61
7,144,168 B2 * 12/2006 Woodman ............. G06F 3/0235 341/22
2005/0214053 A1 * 9/2005 Ishii ....................... B41J 3/4075 400/613

(Continued)

FOREIGN PATENT DOCUMENTS

JP 2005-271549 A 10/2005

*Primary Examiner* — Jung-Mu Chuang
(74) *Attorney, Agent, or Firm* — Banner & Witcoff, Ltd.

(57) ABSTRACT

A field for which a first priority level that has been set is the same as a second priority level that is stored in a priority level storage portion is specified as an update field from among a plurality of fields that have been defined in a content that is stored in a data storage portion. At least one character that is contained in the update field is updated in the specified order. A level of the second priority level is lowering by one level in a case where a character rollover has occurred during the updating of the at least one character. Printable data for the content in which the at least one character has been updated is created in a case where the character rollover has not occurred during the updating of the at least one character. The update field is specified every time the second priority level that is stored in the priority level storage portion is lowered.

10 Claims, 10 Drawing Sheets

(56) References Cited

U.S. PATENT DOCUMENTS

| | | | | |
|---|---|---|---|---|
| 2008/0286024 | A1* | 11/2008 | Kajihara | G06F 3/1208 400/76 |
| 2013/0128316 | A1* | 5/2013 | Kurashina | G06K 15/02 358/1.18 |

* cited by examiner

DATA CREATION DEVICE AND COMPUTER-READABLE MEDIUM STORING DATA CREATION PROGRAM

CROSS-REFERENCE TO RELATED APPLICATION

This application claims priority to Japanese Patent Application No. 2013-82518, filed Apr. 10, 2013. The disclosure of the foregoing application is incorporated herein by reference in its entirety.

BACKGROUND

The present disclosure relates to a data creation device that is configured to create data for printing content that contains characters that have a specified order, like numerals, alphabetic characters, and Japanese syllabic characters, as well as to a computer-readable medium that stores a data creation program.

A printer is known that is provided with a numbering function that sequentially updates a numbering character string and prints the updated character string on a tape. The numbering character string is configured from characters that have a specified order, as do alphabetic characters and Japanese syllabic characters.

SUMMARY

In the tape printer that is provided with the numbering function, in a case where content is printed in which a plurality of numbering character strings are respectively positioned in a plurality of fields, it is conceivable that the numbering character string in each of the fields will be updated and printed. In that case, the known numbering function treats the numbering character string in each of the fields as an independent numbering character string. For example, in a case where the numbering character string in each of the fields is made up of numerals, the known numbering function increments the numerals in all of the fields at the same time.

In some cases, a user may want the numbering character strings that are respectively positioned in the plurality of fields to be linked with one another and updated sequentially when the content is printed. For example, in some cases, among the numerals that are positioned in the individual fields, the user may want to increment a numeral in a low-priority field only in a case where a numeral in a high-priority field has rolled over. It is difficult to implement this sort of numbering with the known numbering function.

Various embodiments of the broad principles derived herein provide a data creation device that is configured to create data for printing content in which characters that are positioned in a plurality of fields are linked with one another and updated sequentially, and also provide a computer-readable medium that stores a data creation program.

Various embodiments herein provide a data creation device that includes a data storage portion, a priority level storage portion, a processor, and a memory. The data storage portion is configured to store content. A plurality of fields are defined in the content. Each of the fields contains at least one character. The at least one character has a regularity that makes it possible for the at least one character to be repeatedly updated in a specified order. A first priority level is set for each one of the plurality of fields. A priority level storage portion is configured to store a second priority level. The memory is configured to store computer-readable instructions. When executed by the processor, the computer-readable instructions cause the processor to perform the steps of specifying as an update field, from among the plurality of fields that have been defined in the content that is stored in the data storage portion, a field for which the first priority level that has been set is the same as the second priority level that is stored in the priority level storage portion, updating the at least one character that is contained in the update field to at least one character that is determined by advancing a value of the at least one character in the specified order, lowering a level of the second priority level that is stored in the priority level storage portion by one level, in a case where a character rollover has occurred during the updating of the at least one character, and creating printable data for the content in which the at least one character has been updated, in a case where the character rollover has not occurred during the updating of the at least one character. The character rollover is the reverting of the value of the at least one character from the last value to the first value in the specified order. The computer-readable instructions cause the processor to perform the specifying of the update field every time the second priority level that is stored in the priority level storage portion is lowered.

Various embodiments also provide a non-transitory computer-readable medium that stores a data creation program that includes computer-readable instructions to be executed by a processor of a data creation device. The data creation device is configured to access a data storage portion and a priority level storage portion. The data storage portion is configured to store content. A plurality of fields is defined in the content. Each of the fields contains at least one character. The at least one character has a regularity that makes it possible for the at least one character to be repeatedly updated in a specified order. A first priority level is set for each one of the plurality of fields. The priority level storage portion is configured to store a second priority level. When executed by the processor, the computer-readable instructions cause the processor to perform the steps of specifying as an update field, from among the plurality of fields that have been defined in the content that is stored in the data storage portion, a field for which the first priority level that has been set is the same as the second priority level that is stored in the priority level storage portion, updating the at least one character that is contained in the update field to at least one character that is determined by advancing a value of the at least one character in the specified order, lowering a level of the second priority level that is stored in the priority level storage portion by one level, in a case where a character rollover has occurred during the updating of the at least one character, and creating printable data for the content in which the at least one character has been updated, in a case where the character rollover has not occurred during the updating of the at least one character. The character rollover is the reverting of the value of the at least one character from the last value to the first value in the specified order. The computer-readable instructions cause the processor to perform the specifying of the update field every time the second priority level that is stored in the priority level storage portion is lowered.

BRIEF DESCRIPTION OF THE DRAWINGS

Embodiments of the present disclosure will be described below in detail with reference to the accompanying drawings in which.

DETAILED DESCRIPTION

Figure 1:
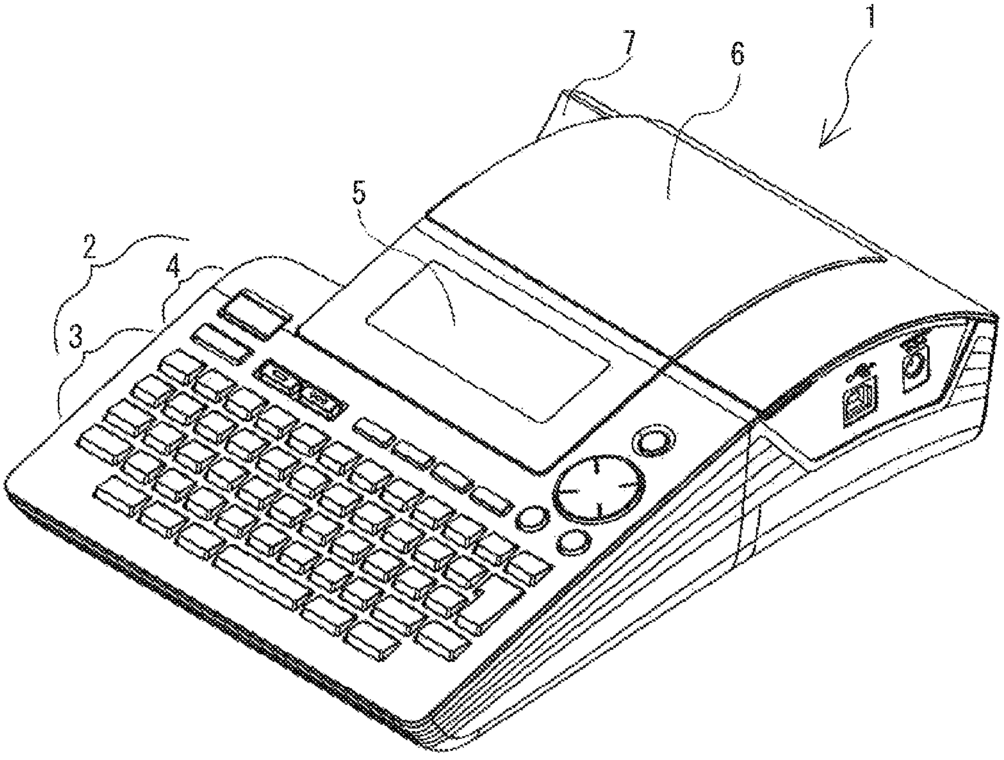
FIG. 1 is an oblique view of a tape printer in a state in which a cover is closed.

Hereinafter, embodiments of the present disclosure will be explained with reference to the drawings. Note that the referenced drawings are used for explaining technological features that the present disclosure can utilize, and device configurations and the like that are shown in the drawings are merely explanatory examples that do not serve to restrict the content of the present disclosure.

A first embodiment of the present disclosure will be explained. The overall configuration of a tape printer 1 will be explained with reference to FIGS. 1 and 2. In the explanation that follows, the upper right side, the lower left side, the lower right side, the upper left side, the top side, and the bottom side in FIGS. 1 and 2 respectively define the rear side, the front side, the right side, the left side, the top side, and the bottom side of the tape printer 1.

As shown in FIG. 1, a keyboard 3 for inputting characters (text characters, symbols, numerals, and the like) is provided on the top face of the tape printer 1. A function key cluster 4 that includes a power switch, operation keys, cursor keys, and the like is provided to the rear of the keyboard 3 (the upper right side in the drawings). The operation keys include a print key, a text key, an enter key, an escape key, a delete all key, a cancel key, and the like, which will be described later. In the explanation that follows, the keyboard 3 and the function key cluster 4 will be called an operation portion 2 when they are referenced collectively.

A display 5 is provided to the rear of the function key cluster 4. A cover 6 that can be opened and closed is provided in the rear portion of the top face of the printer 1. A tape tray 7 that receives a printed tape that has been cut by a cutting mechanism (not shown in the drawings) that will be described later is provided at the left rear corner of the printer 1.

Figure 2:
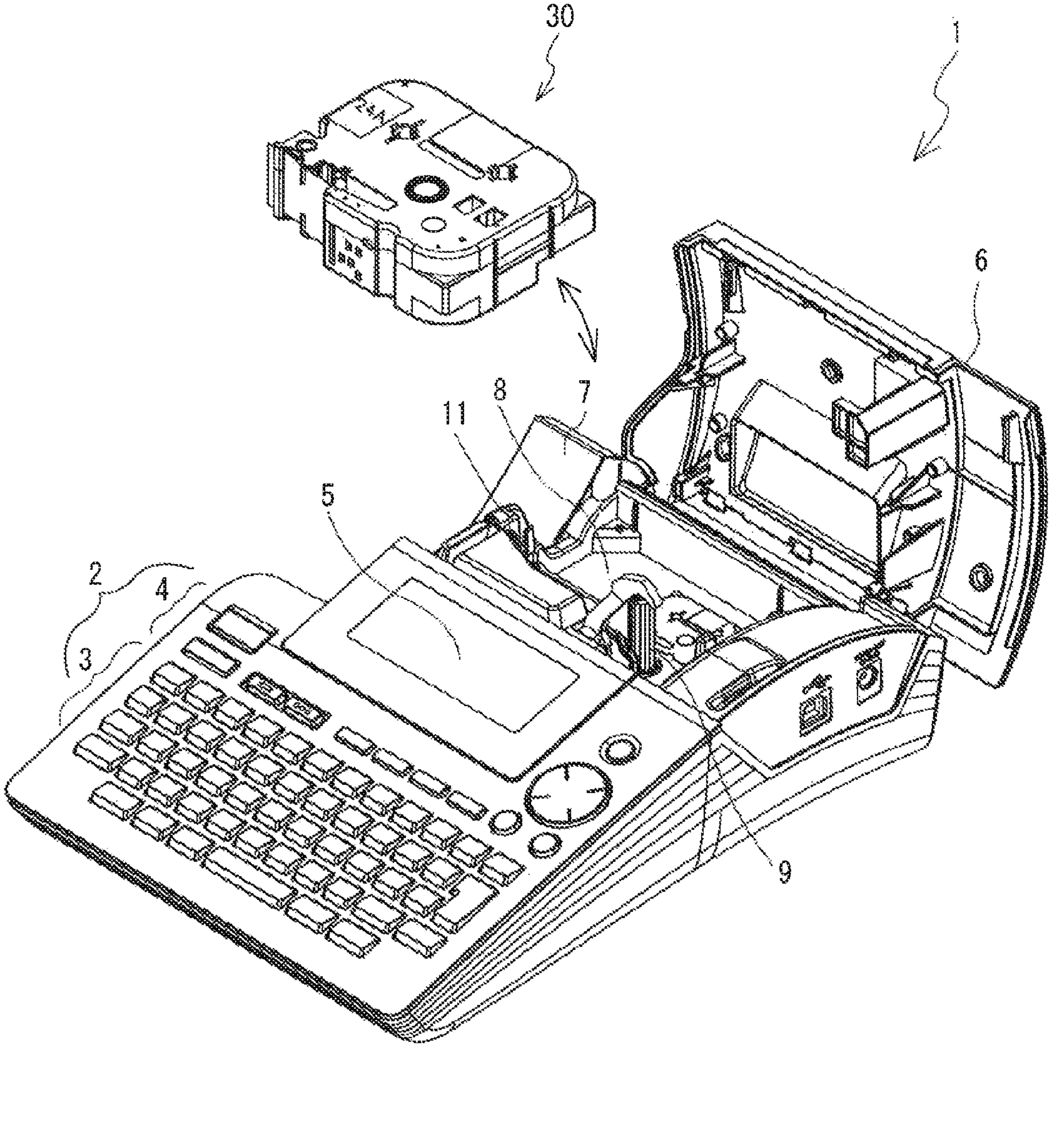
FIG. 2 is an oblique view of the tape printer and a tape cassette in a state in which the cover is open.

As shown in FIG. 2, a cassette mounting portion 8 into and from which a tape cassette 30 is mounted in and removed is formed to the rear of the display 5. The tape cassette 30 in the present embodiment includes a cassette case that is a substantially rectangular three-dimensional (box-shaped) housing, in the interior of which are contained a tape, an ink ribbon, and the like. Using the tape cassette 30 that is mounted in the cassette mounting portion 8, the tape printer 1 performs the printing of characters that have been input through the keyboard 3.

A tape drive shaft 11 for transporting the tape, a ribbon winding shaft 9 for winding up the used ink ribbon, a thermal head 10 (refer to FIG. 3) that prints the characters, and the like are provided in the cassette mounting portion 8. In the present embodiment, the thermal head 10 uses the ink ribbon that has not yet been used to perform the printing on the tape that is being transported. The cutting mechanism (not shown in the drawings) that cuts the printed tape is provided on the downstream side of the thermal head 10 in relation to the direction in which the tape is transported.

Figure 3:
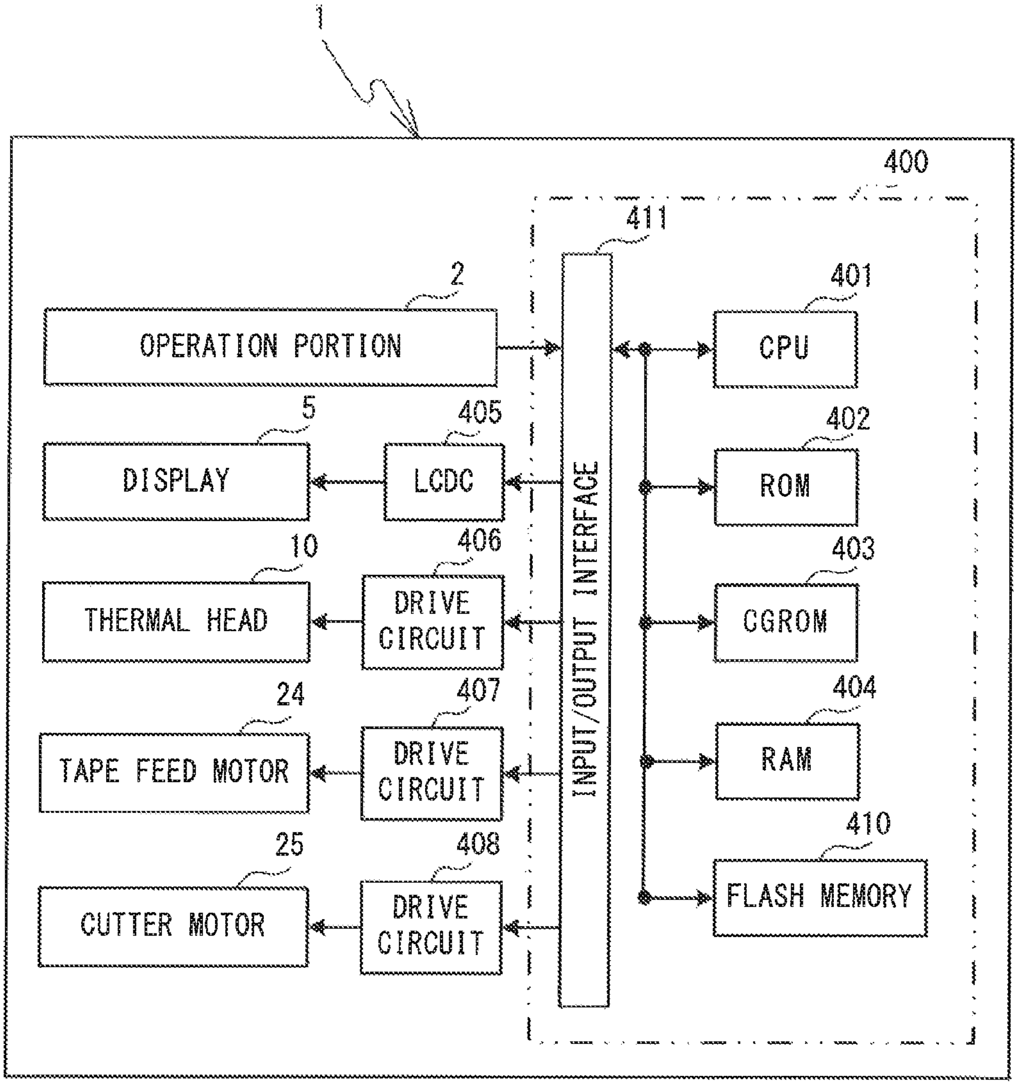
FIG. 3 is a block diagram that shows an electrical configuration of the tape printer.

An electrical configuration of the tape printer 1 will be explained with reference to FIG. 3. As shown in FIG. 3, the tape printer 1 is provided with a control circuit 400 that is formed on a control circuit board. The control circuit 400 is provided with a CPU 401, a ROM 402, a CGROM 403, a RAM 404, a flash memory 410 an input/output interface 411, and the like, which are connected to one another through data buses.

Various types of programs and the like that the CPU 401 executes in order to control the printer 1 are stored in the ROM 402. Printing dot pattern data for printing the characters are stored in the CGROM 403. A plurality of storage areas, such as a text memory, a print buffer, and the like, are provided in the RAM 404. Various types of setting values that will be described later (a current priority level y, a character rollover counter k, an update quantity p) are stored in the RAM 404. Content that has been printed by the tape printer 1 in the past is stored in the flash memory 410. In the present embodiment, the content is in the form of image data files that contain characters (for example, numerals, alphabetic characters, Japanese syllabic characters, and the like) that have a regularity that makes it possible for them to be repeatedly updated in a specified order.

The operation portion 2, a liquid crystal display circuit (LCDC) 405, drive circuits 406, 407, 408, and the like are connected to the input/output interface 411. The liquid crystal display circuit (LCDC) 405 has a video RAM (not shown in the drawings) for outputting display data to the display 5. The drive circuit 406 is an electronic circuit for operating the thermal head 10. The drive circuit 407 is an electronic circuit for operating a tape feed motor 24 that rotates the ribbon winding shaft 9 and the tape drive shaft 11. The drive circuit 408 is an electronic circuit for operating a cutter motor 25 that drives the cutting mechanism (not shown in the drawings).

Numbered printing according to the first embodiment will be explained with reference to FIGS. 4 to 6. Numbered printing is an operation that successively updates (that is, increments the numbering in) numbering character strings that are included in the content, following a specified order, and successively prints a plurality of content items that have been updated.

In the present embodiment, a user uses the operation portion 2 to designate the content, among the content that is stored in the flash memory 410, for which the numbered printing is to be performed. The user sets numbering fields for the designated content. The numbering fields are fields that each contain a numbering character string that is configured from characters, among the characters that are included in the content, that are subject to numbering. The user also sets a priority level for each of the designated numbering fields. The priority level indicates the order in which the numbering will be performed.

For example, if the user designates content 110 (refer to FIG. 4) as the content for which the numbered printing is to be performed, the designated content 110 is read into the RAM 404 from the flash memory 410. As shown in FIG. 4, an edit screen 100 for editing the designated content 110 is displayed on the display 5. For example, the user may use the operation portion 2 to define four numbering fields 111 to 114 in the content 110. Each one of the numbering fields 111 to 114 contains a numbering character string that is configured from two numerals. The user also uses the operation portion 2 to set the priority levels for each of the numbering fields 111 to 114.

In the present embodiment, the user can set three priority levels: "highest priority", "next highest priority", and "no priority". The "highest priority" setting is the highest priority level. The "next highest priority" setting is one level lower than the highest priority level. The "no priority" setting is one level lower than the next highest priority level. As an example, take a case in which the user sets the numbering fields 111, 112 to "highest priority" and sets the numbering fields 113, 114 to "next highest priority". The numbering fields 111 to 114 that the user has set, along with their priority levels, are stored in the RAM 404 in association with the content 110.

After setting the numbering fields and their priority levels, the user uses the operation portion 2 to designate a number of rounds of printing and to issue a command to start the numbered printing. Based on the current content, the CPU 401 performs numbered printing processing, which will be explained below. The current content is the content that is stored in the RAM 404 and for which the numbered printing is to be performed.

The numbered printing processing in the first embodiment will be explained with reference to FIG. 5. In the numbered printing processing that is shown in FIG. 5, first, the content is printed (Step S1). Specifically, print data are created based on the current content. The current content is then printed on the tape based on the print data that have been created. A label on which the current content has been printed is then created by cutting the printed tape.

Next, the various setting values (the current priority level y, the character rollover counter k, the update quantity p) that are stored in the RAM 404 are initialized (Step S3). The current priority level y indicates the current field. The current field is the numbering field that is the object of the processing. The character rollover counter k indicates the number of times that character rollover, which will be described later, has occurred in the current character string. The current character string is the numbering character string that is contained in the current field. At Step S3 in the present embodiment, the current priority level y is set to the highest priority, and the character rollover counter k is set to "0".

The update quantity p indicates the amount by which the current character string will be advanced in the specified order. In the present embodiment, the numbering character string that is contained in the numbering field for which the highest priority level has been set is updated by one character's worth in one round of numbering. For example, in a case where the numbering character string is made up of numerals, the numbering character string is incremented by 1 in one round of numbering. In a case where the numbering character string is made up of alphabetic characters (or Japanese syllabic characters), the numbering character string is updated to the next character in alphabetical order (or Japanese syllabic order) in one round of numbering. Therefore, at Step S3 in the present embodiment, the update quantity p is set to "1".

After the content is printed, a determination is made as to whether or not the printing has been performed for the number of rounds that the user designated (Step S5). In a case where the number of times that the printing has been performed at Step S1 has not reached the designated number of rounds, a determination is made that the printing has not been performed for the designated number of rounds (NO at Step 5). In that case, a numbering field is specified (Step S7). Specifically, the numbering fields that are contained in the current content are searched in the order of the characters that are contained in the current content, and one of the numbering fields that is contained in the current content is found and specified. A determination is made as to whether or not the priority level of the specified numbering field is the same as the current priority level y (Step S9).

In a case where the priority level of the specified numbering field is the same as the current priority level y (YES at Step S9), the specified numbering field is set as the current field. Next, the current character string is updated based on the update quantity p (Step S11). The current character string is thus updated to a character string that is determined by advancing the characters by the specified quantity in the specified order. For example, in a case where the current character string is made up of numerals, the current character string is updated to the numerical value that is determined by advancing (adding to) the numerals in ascending order by the update quantity p.

Next, a determination is made as to whether or not character rollover has occurred in the current character string (Step S13). Character rollover is what happens when the character that is advanced in the current character string is changed from the last value to the first value in the specified order. For example, in a case where the current character string is a two-digit number, character rollover is what happens in an overflow situation where the current character string is advanced from "99", which is the last value in ascending order, to "00", which is the first value. In a case where character rollover has occurred in the current character string (YES at Step S13), the number of character rollovers is added to the character rollover counter k (Step S15).

In a case where the priority level that has been set for the specified numbering field is not the same as the current priority level y (NO at Step S9), a determination is made as to whether or not a next numbering field exists (Step S17). The processing also advances to Step S17 in a case where character rollover has not occurred in the current character string (NO at Step S13), as well as after Step S15 is performed. In a case where a next numbering field exists (YES at Step S17). In that case, the processing returns to Step S7. In this manner, all of the numbering fields that correspond to the current priority level y are processed, and their numbering character strings are updated based on the update quantity p (Step S11), and in a case where character rollover has occurred, the character rollover counter k is incremented (Step S15).

In a case where a next numbering field does not exist (NO at Step S17), a determination is made as to whether or not the value of the character rollover counter k is not less than "1" (Step S19). In a case where the value of the character rollover counter k is not less than "1" (YES at Step S19), the current priority level y is set to a priority level that is one step lower (Step S21). The update quantity p is updated to the same value as the character rollover counter k (Step S23). The character rollover counter k is updated to "0" (Step S25). Then the processing returns to Step S7.

Thus, in a case where character rollover has occurred in a numbering field that corresponds to the current priority level y, a numbering field that corresponds to the priority level that is one step lower than the current priority level y is set as the current field (Step S7; YES at Step S9). The numbering character string in the current field is updated based on the update quantity p, which has the same value as the character rollover counter k (Step S11), and in a case where further character rollover has occurred, the character rollover counter k is updated (Step S15).

In a case where the value of the character rollover counter k is less than 1 (NO at Step S19), character rollover has not occurred in any of the numbering fields that correspond to the current priority level y. In that case, the processing returns to Step S1. Thus the content for which the numbering character strings have been updated one time is printed on the tape (Step S1). The updating of the numbering character strings is then performed in the same manner as described above, based on the updated content.

The processing that is described above is performed repeatedly until the number of times that Step S1 has been performed reaches the designated number of rounds. In a case where the number of times that Step S1 has been performed has reached the designated number of rounds, a determination is made that the printing has been performed for the designated number of rounds that the user designated (YES at Step S5). In that case, the numbered printing processing is terminated. In this manner, a plurality of content items in which the numbering character strings have been updated as many times as the designated number of printing rounds are printed on the tape, and a plurality of labels are created, on each of which one content item is printed.

Figure 4:
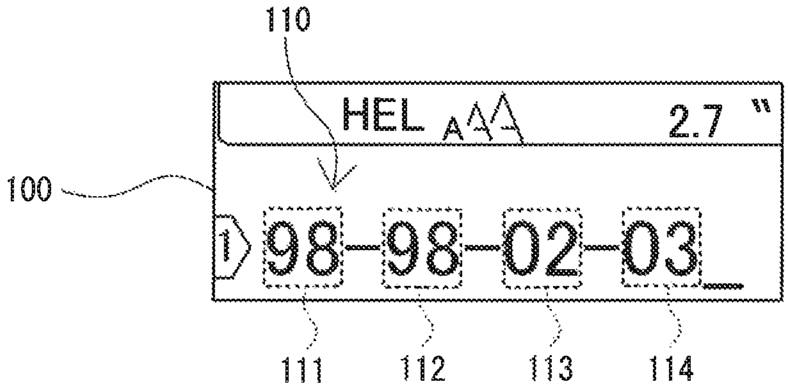
FIG. 4 is a specific example of an edit screen according to a first embodiment.
Figure 5:
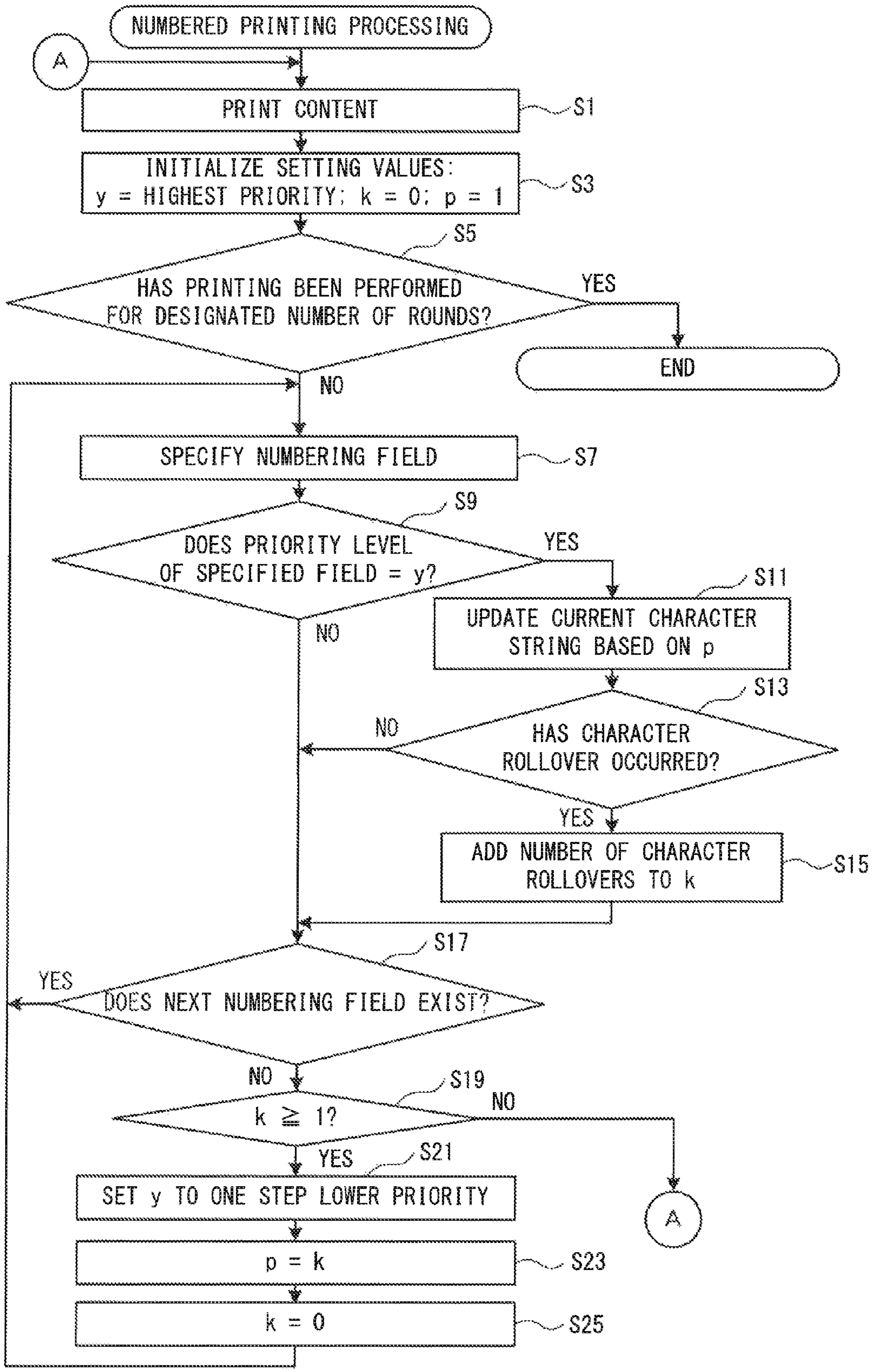
FIG. 5 is a flowchart of numbered printing processing according to the first embodiment.
Figure 6:
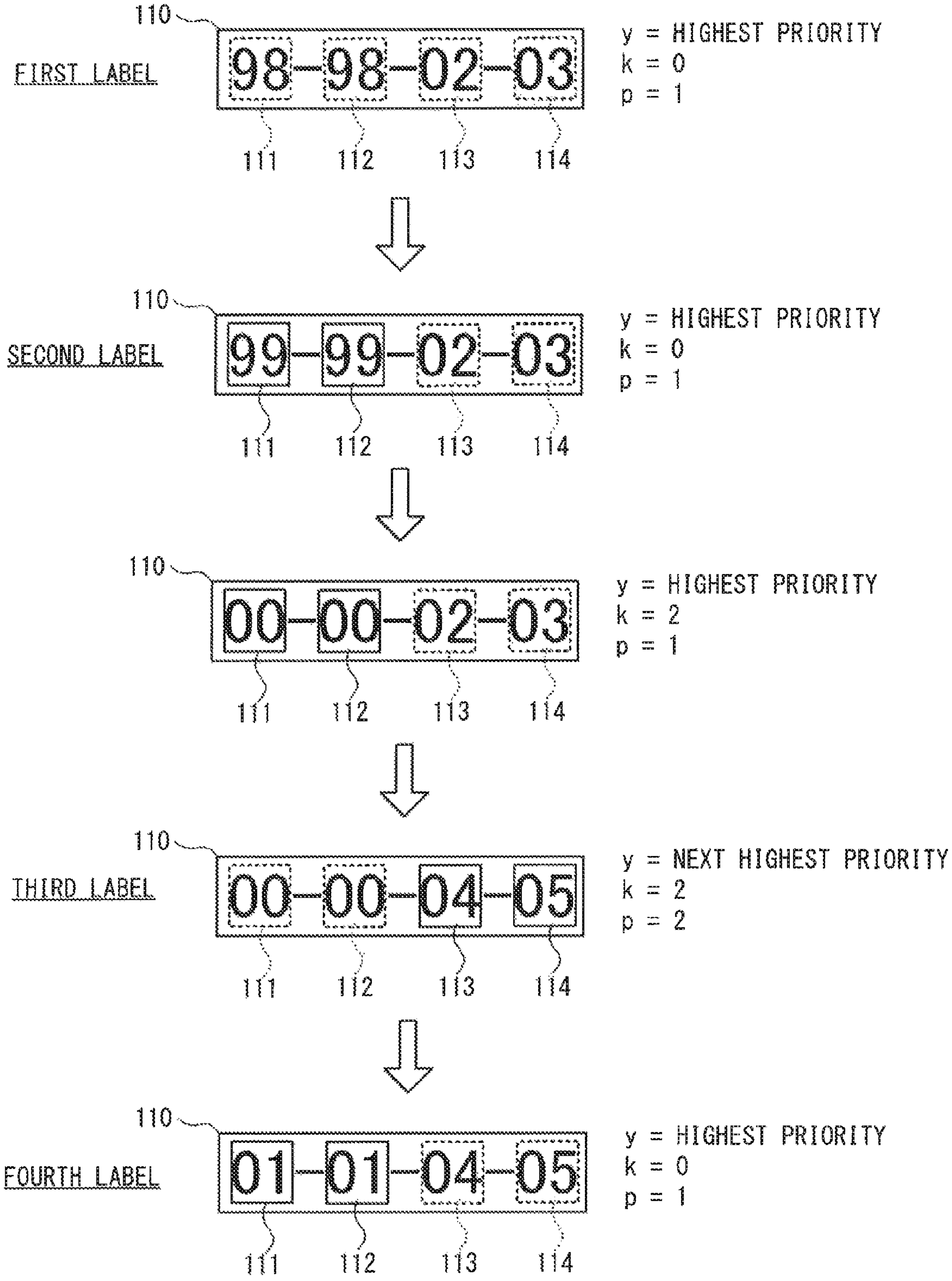
FIG. 6 is an example of creation of a label on which content is printed.

A specific example of the numbered printing processing that is shown in FIG. 5 will be explained with reference to FIG. 6. Hereinafter, an example will be explained in which the user has issued the command to perform the numbered printing, starting the printing with the content 110 that is shown in FIG. 4, and has designated 4 as the number of printing rounds.

When the numbered printing processing (FIG. 5) is started, first, a first label is created by printing the content 110 that is shown in FIG. 4 (Step S1). Next, the setting values are initialized (Step S3). The numbering field 111 is specified, for which the priority level is "highest priority", the same as the current priority level y (Step S7; YES at Step S9). The character string "98" in the numbering field 111 is updated to "99" by adding the update quantity p "1" to it (Step S11). Then the numbering field 112 is specified, for which the priority level is "highest priority", the same as the current priority level y (YES at Step S17; Step S7; YES at Step S9). The character string "98" in the numbering field 112 is updated to "99" by adding the update quantity p "1" to it (Step S11).

Character rollover has not occurred in either one of the numbering fields 111, 112, so the value of the character rollover counter k is "0" (NO at Step S13; NO at Step S17; NO at Step S19). A second label is created by printing the content 110, in which the character strings in the numbering fields 111, 112 have both been updated to "99" (Step S1).

Next, the numbering field 111 is specified, for which the priority level is "highest priority", the same as the current priority level y (Step S7; YES at Step S9). The character string "99" in the numbering field 111 is updated to "00" by adding the update quantity p "1" to it (Step S11). Character rollover occurred once in the character string (YES at Step S13), so the character rollover counter k is incremented and becomes "1" (Step S15). The numbering field 112 is then specified, for which the priority level is "highest priority", the same as the current priority level y (Step S7; YES at Step S9). The character string "99" in the numbering field 112 is updated to "00" by adding the update quantity p "1" to it (Step S11). Character rollover occurred once in the character string (YES at Step S13), so the character rollover counter k is incremented and becomes "2" (Step S15).

The character rollover counter k is not less than "1" (NO at Step S17; YES at Step S19), so the current priority level y is set one step lower to "next highest priority" (Step S21). The update quantity p is updated to "2" the same value as the character rollover counter k (Step S23). The character rollover counter k is updated to "0" (Step S25). Next, the numbering field 113 is specified, for which the priority level is "next highest priority", the same as the current priority level y (Step S7; YES at Step S9). The character string "02" in the numbering field 113 is updated to "04" by adding the update quantity p "2" to it (Step S11). The numbering field 114 is then specified, for which the priority level is "next highest priority", the same as the current priority level y (Step S7; YES at Step S9). The character string "03" in the numbering field 114 is updated to "05" by adding the update quantity p "2" to it (Step S11).

Character rollover has not occurred in either one of the numbering fields 113, 114, so the value of the character rollover counter k is "0" (NO at Step S13; NO at Step S17; NO at Step S19). A third label is created by printing the content 110, in which the character strings in the numbering fields 111 to 114 have respectively been updated to "00", "00", "04", "05" (Step S1). The setting values are initialized, so that the current priority level y, the character rollover counter k, and the update quantity p revert to their initial values (Step S3).

Next, the numbering field 111 is specified, for which the priority level is "highest priority", the same as the current priority level y (Step S7; YES at Step S9). The character string "00" in the numbering field 111 is updated to "01" by adding the update quantity p "1" to it (Step S11). The character string "00" in the numbering field 112 is updated to "01" in the same manner. Character rollover has not occurred in either one of the numbering fields 111, 112 (NO at Step S13; NO at Step S17; NO at Step S19), so a fourth label is created by printing the content 110, in which the character strings in the numbering fields 111, 112 have both been updated to "01" (Step S1). Once the fourth label has been created (YES at Step S5), the numbered printing processing is terminated.

A second embodiment of the present disclosure will be explained. In the explanation that follows, the same reference numerals will be used and explanations will be omitted for configurations and processing that are the same as in the first embodiment, and only those points that are different from the first embodiment will be explained.

Figure 7:
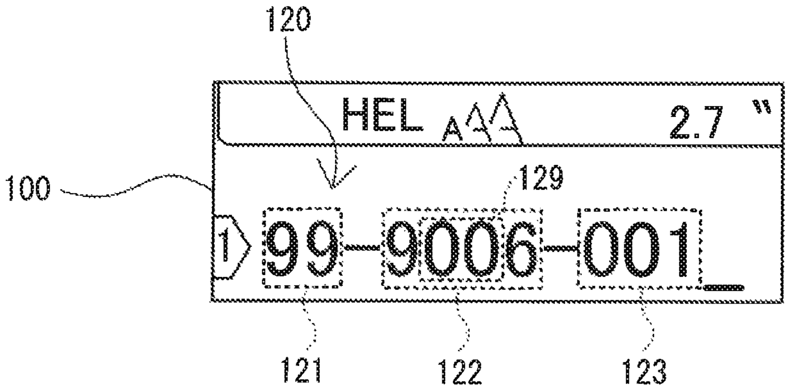
FIG. 7 is a specific example of an edit screen according to a second embodiment.

For example, if the user designates content 120 (refer to FIG. 7) as the content for which the numbered printing is to be performed, the designated content 120 is read into the RAM 404 from the flash memory 410. As shown in FIG. 7, the edit screen 100 for editing the designated content 120 is displayed on the display 5. For example, the user may use the operation portion 2 to define three numbering fields 121 to 123 in the content 120. The numbering fields 121 to 123 contain numbering character strings of two numerals, four numerals, and three numerals, respectively.

The user uses the operation portion 2 to set the priority levels for each of the numbering fields 121 to 123. As an example, take a case in which the user sets the numbering field 121 to the "next highest priority", the numbering field 122 to the "highest priority", and the numbering field 123 to "no priority".

The user also uses the operation portion 2 to set a non-updatable field. The non-updatable field indicates characters, among the plurality of the characters that are contained in a numbering field, for which updating is prohibited. As an example, the user sets a non-updatable field 129 that contains the second and third characters within the numbering field 122. The numbering fields 121 to 123, their priority levels, and the non-updatable field 129 are stored in the RAM 404 in association with the content 120.

After setting the numbering fields, the priority levels, and the non-updatable field, the user uses the operation portion 2 to designate the number of printing rounds and to issue a command to start the numbered printing. Based on the current content in the RAM 404, the CPU 401 performs the numbered printing processing that is explained below.

Figure 8:
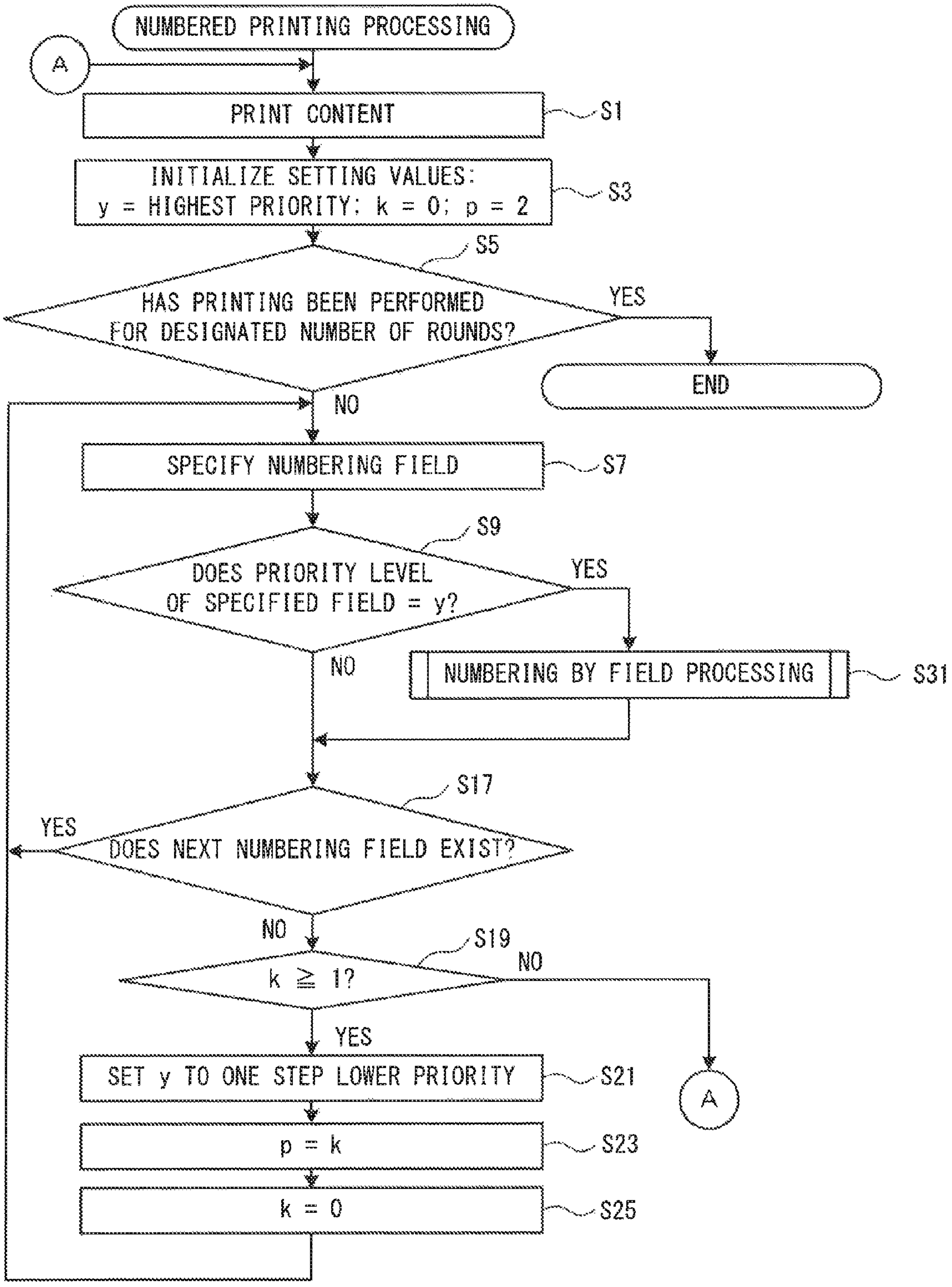
FIG. 8 is a flowchart of numbered printing processing according to the second embodiment.

The numbered printing processing in the second embodiment will be explained with reference to FIGS. 8 and 9. In the numbered printing processing that is shown in FIG. 8, the printing of the content is performed in the same manner as in the first embodiment (Step S1). The various setting values that are stored in the RAM 404 are initialized (Step S3).

In the present embodiment, the numbering character strings that are contained in the numbering fields for which the highest priority level has been set are each updated by two characters' worth in one round of numbering. For example, in a case where the numbering character string is made up of numerals, the numbering character string is incremented by "2" in one round of numbering. In a case where the numbering character string is made up of alphabetic characters (or Japanese syllabic characters), the numbering character string is advanced by two characters in alphabetical order (or Japanese syllabic order) in one round of numbering. Therefore, at Step S3 in the present embodiment, the update quantity p is set to "2".

Next, a determination is made as to whether or not the printing has been performed for the number of rounds that the user designated (Step S5). In a case where the printing has not been performed for the designated number of rounds (NO at Step 5) a numbering field is specified (Step S7). In a case where the priority level that has been set for the specified numbering field is the same as the current priority level y (YES at Step S9), numbering by field processing is performed (Step S31).

Figure 9:
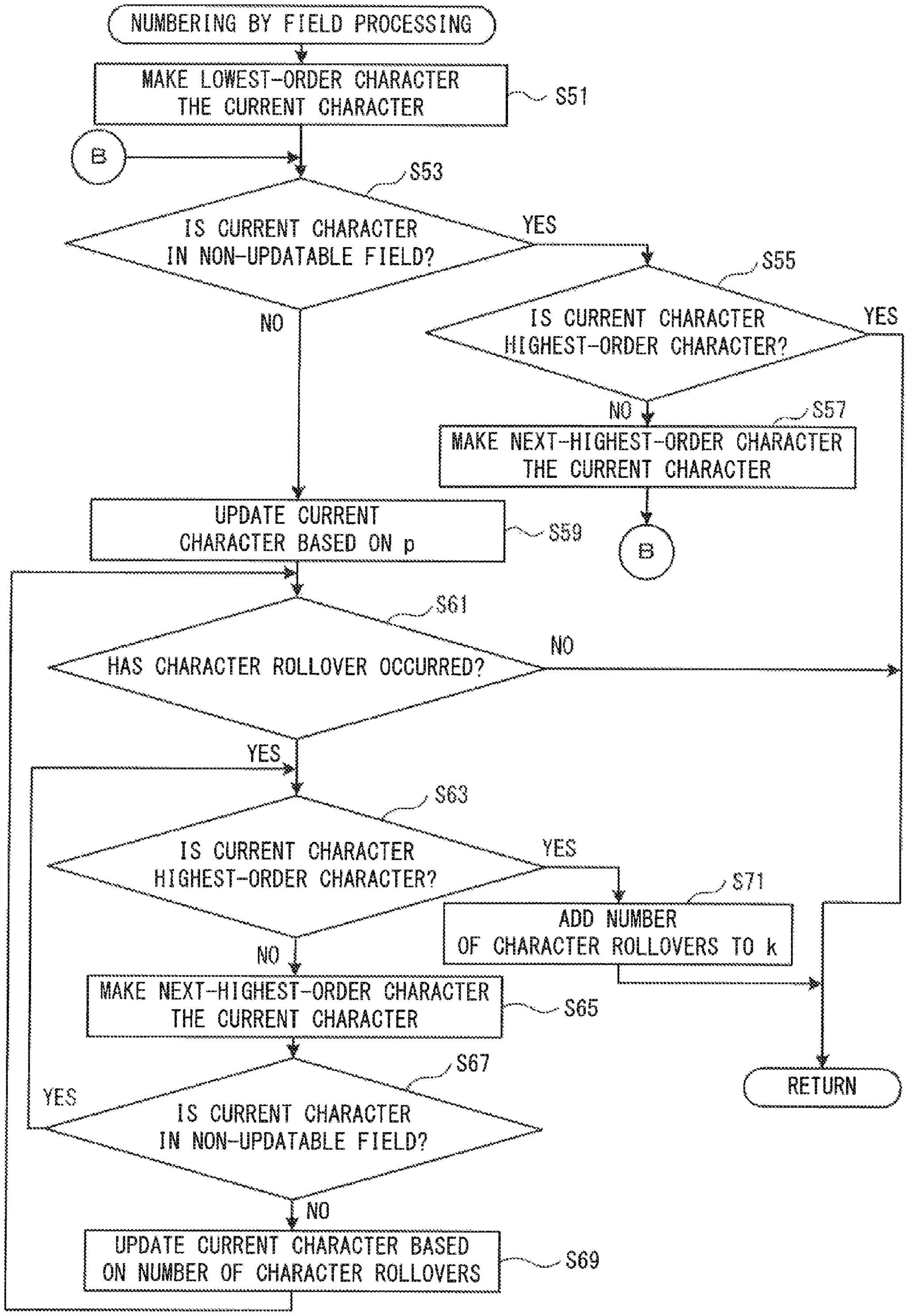
FIG. 9 is a flowchart of numbering by field processing.

As shown in FIG. 9, in the numbering by field processing, first, the lowest-order character is set as the current character (Step S51). The lowest-order character is the character that is in the lowest-order position in the string of characters that make up the current character string. Next, a determination is made as to whether or not the current character is in a non-updatable field (Step S53). In a case where the current character is in a non-updatable field (YES at Step S53), a determination is made as to whether or not the current character is the highest-order character (Step S55). The highest-order character is the character that is in the highest-order position in the string of characters that make up the current character string.

In a case where the current character is not the highest-order character (NO at Step S55), the next-highest-order character is set as the current character (Step S57). Then the processing returns to Step S53. The result of the repeated performing of Steps S53 to S57 is that the lowest-order character that is not in a non-updatable field in the current character string is set as the current character. In contrast, in a case where the current character is the highest-order character (YES at Step S55), the numbering by field processing is terminated, and the processing returns to the numbered printing processing (FIG. 8).

In a case where the current character is not in a non-updatable field (NO at Step S53), the current character is updated based on the update quantity p (Step S59). The current character is thus updated to a character that is determined by advancing it by the specified quantity in the specified order. For example, in a case where every character that makes up the current character string is a numeral, the current character is updated to the numeral that is determined by advancing (adding to) the numeral in ascending order by the update quantity p.

Next, a determination is made as to whether or not character rollover has occurred for the current character (Step S61). For example, in a case where every character that makes up the current character string is a numeral, character rollover is what happens in an overflow situation where the current character is advanced from "9", which is the last value in ascending order, to "0", which is the first value. In a case where character rollover has occurred for the current character (YES at Step S61), a determination is made as to whether or not the current character is the highest-order character (Step S63).

In a case where the current character is not the highest-order character (NO at Step S63), the next-highest-order character is set as the current character (Step S65). A determination is made as to whether or not the current character is in a non-updatable field (Step S67). In a case where the current character is in a non-updatable field (YES at Step S67), the processing returns to Step S63. In a case where the current character is not in a non-updatable field (NO at Step S67), the current character is updated in accordance with the number of times that character rollover occurred at Step S59 (Step S69). For example, in a case where every character that makes up the current character string is a numeral, the number of times that character rollover has occurred is added to the current character. Then the processing returns to Step S61. Thus, in a case where character rollover has occurred for any character other than the highest-order character, the lowest-order character that is not in a non-updatable field, among the characters that are of a higher order than the current character, is updated in accordance with the number of times that character rollover has occurred.

In a case where the current character is the highest-order character (YES at Step S63), the number of times that character rollover has occurred is added to the character rollover counter k (Step S71). Thus, in a case where character rollover has occurred for the highest-order character among the characters that are not in a non-updatable field, the character rollover counter k is incremented in accordance with the number of times that character rollover has occurred. Then the numbering by field processing is terminated, and the processing returns to the numbered printing processing (FIG. 8).

As shown in FIG. 8, in a case where the priority level that has been set for the specified numbering field is not the same as the current priority level y (NO at Step S9), as well as after Step S31 is performed, a determination is made as to whether or not a next numbering field exists (Step S17). The subsequent processing (Steps S19 to S25) is the same as in the first embodiment, so an explanation will be omitted.

Figure 10:
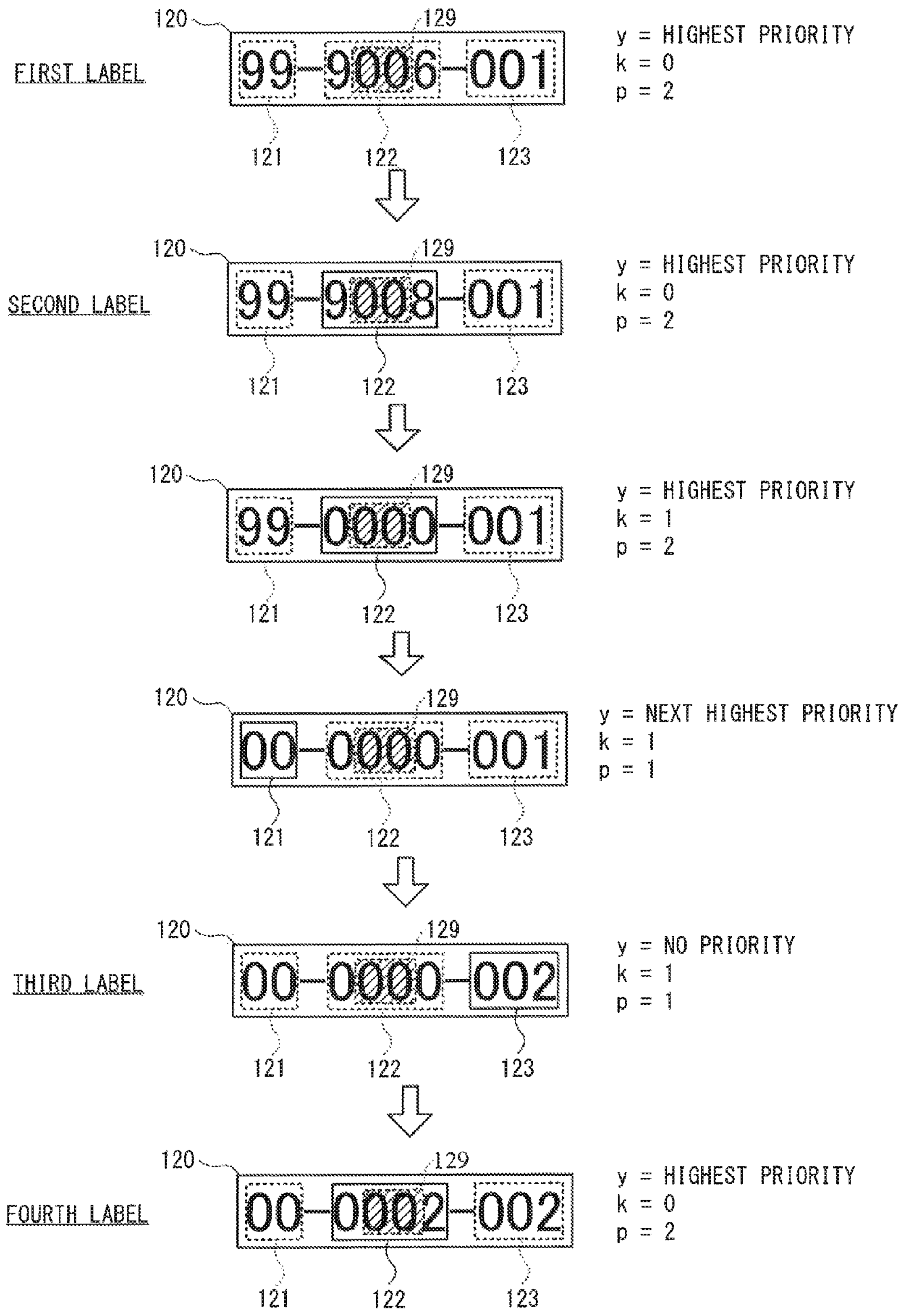
FIG. 10 is an example of creation of a label on which content is printed.

A specific example of the numbered printing processing that is shown in FIGS. 8 and 9 will be explained with reference to FIG. 10. Hereinafter, an example will be explained in which the user has issued the command to perform the numbered printing, starting the printing with the content 120 that is shown in FIG. 7, and has designated 4 as the number of printing rounds.

When the numbered printing processing (FIG. 8) is started, first, a first label is created by printing the content 120 that is shown in FIG. 7 (Step S1). Next, the setting values are initialized (Step S3). The numbering field 122 is specified, for which the priority level is "highest priority", the same as the current priority level y (Step S7; YES at Step S9). The lowest-order character in the numbering field 122 is not in the non-updatable field 129 (NO at Step S53), so the lowest-order character "6" is updated to "8" by adding the update quantity p "2" to it (Step S59). Character rollover has not occurred for the lowest-order character (NO at Step S61), so the value of the character rollover counter k is "0" (NO at Step S17; NO at Step S19). A second label is created by printing the content 120, in which the character string in the numbering field 122 has been updated to "9008" (Step S1).

Next, the numbering field 122 is specified, for which the priority level is "highest priority", the same as the current priority level y (Step S7; YES at Step S9). The lowest-order character "8" is updated to "0" by adding the update quantity p "2" to it (NO at Step S53; Step S59). Character rollover has occurred for the lowest-order character (YES at Step S61). The second character and the third character, which are located in the non-updatable field 129, are not updated, so the highest-order character "9" is updated to "0" by adding the number of character rollovers "1" to it (Steps S63 to S69).

Character rollover has now occurred for the highest-order character (YES at Step S61; YES at Step S63), so the character rollover counter k is incremented to "1" (Step S71). The character rollover counter k is not less than "1" (NO at Step S17; YES at Step S19), so the current priority level y is set one step lower to "next highest priority" (Step S21). The update quantity p is updated to "1" the same value as the character rollover counter k (Step S23). The character rollover counter k is updated to "0" (Step S25). Next, the numbering field 121 is specified, for which the priority level is "next highest priority", the same as the current priority level y (Step S7; YES at Step S9). The character string "99" in the numbering field 121 is updated to "00" by adding the update quantity p "1" to it (Steps S59 to S69).

Character rollover has occurred in the numbering field 121 (YES at Step S61; YES at Step S63), so the character rollover counter k is incremented to "1" (Step S71). The character rollover counter k is not less than "1" (NO at Step S17; YES at Step S19), so the current priority level y is set one step lower to "no priority" (Step S21). The update quantity p is updated to "1" the same value as the character rollover counter k (Step S23). The character rollover counter k is updated to "0" (Step S25).

Next, the numbering field 123 is specified, for which the priority level is "no priority", the same as the current priority level y (Step S7; YES at Step S9). The character string "001" in the numbering field 123 is updated to "002" by adding the update quantity p "1" to it (Step S59). Character rollover has not occurred in the numbering field 123 (NO at Step S61; NO at Step S17; NO at Step S19), so a third label is created by printing the content 120, in which the character strings in the numbering fields 121, 122, 123 have respectively been updated to "00", "0000", "002" (Step S1). The setting values are initialized, so that the current priority level y, the character rollover counter k, and the update quantity p revert to their initial values (Step S3).

Next, the numbering field 122 is specified, for which the priority level is "highest priority", the same as the current priority level y (Step S7; YES at Step S9). The lowest-order character "0" is updated to "2" by adding the update quantity p "2" to it (NO at Step S53; Step S59). Character rollover has not occurred for the lowest-order character (NO at Step S61; NO at Step S17; NO at Step S19), so a fourth label is created by printing the content 120, in which the character string in the numbering field 122 has been updated to "0002" (Step S1). Once the fourth label has been created (YES at Step S5), the numbered printing processing is terminated.

As explained above, according to the first and second embodiments, the numbering fields for which the priority levels that are stored in the RAM 404 have been set are specified based on the content that is stored in the RAM 404 (Steps S7, S9). The characters that are contained in the specified numbering fields are updated to characters that are determined by advancing them by the specified quantities in the specified order (Step S11 or Step S31). In a case where character rollover has occurred during the updating of the characters, the priority level that is stored in the RAM 404 is updated to the priority level that is one step lower (Step S21). In a case where character rollover has not occurred during the updating of the characters, the print data are created for the content in which the characters have been updated (Step S1). Every time the priority level that is stored in the RAM 404 is updated, the fields for which the updated priority level has been set are specified (Steps S21, S7, S9).

Thus, the characters that are contained in the numbering fields are updated in accordance with the specified character order, starting with the numbering fields that have the highest priority level among the plurality of the numbering fields that are contained in the content. More specifically, in a case where character rollover has occurred during the updating of the characters, the characters that are contained in the numbering fields with the next highest priority level are updated in accordance with the specified character order. In a case where character rollover has not occurred during the updating of the characters, the print data are created for the content in which the characters have been updated. Therefore, the print data can be created for a plurality of content items that have been updated sequentially in association with the characters that are located in the plurality of the numbering fields.

In a case where a plurality of the numbering fields for which the same priority level has been set are specified (Steps S7, S9), the characters that are contained in the specified plurality of the numbering fields are updated (Step S11 or Step S31). Thus the print data can be created for content in which numbering has been performed for all of the plurality of the numbering fields that have the same priority level.

The number of times that character rollover has occurred during the updating of the characters is counted (Step S15 or Step S71). In a case where the updating is performed for the characters that are contained in the numbering fields for which the priority level is "next highest priority" or "no priority", which are lower than the specific priority level "highest priority", the characters are updated in accordance with the counted number of character rollovers (Steps S23, S25, S11). Thus, in a case where character rollover has occurred in a numbering field that has a high priority level, the characters that are contained in the numbering fields with lower priority levels can be updated appropriately.

Based on the content that is stored in the RAM 404, the non-updatable fields, which indicate the character positions for which updating is prohibited, are specified among the plurality of the characters that are contained in the numbering fields (Steps S53, S67). Among the plurality of the characters that are contained in the specified numbering field, the characters that are located in positions other than the specified non-updatable fields are updated (Steps S59, S69). The user is thus freely able to specify, among the characters that are contained in the numbering fields, the characters for which the numbering will be performed and the characters for which the numbering will not be performed.

In a case where the print data have been created, the priority level that is stored in the RAM 404 is set to the specific priority level "highest priority" (Step S3). Every time that the priority level is set to the specific priority level "highest priority", the numbering fields for which the specific priority level "highest priority" has been set are specified (Step S7). Thus, every time that the print data for one content item are created, the print data can be created for the next content item, in which the numbering is performed on the characters that were contained in the preceding content item.

The present disclosure is not limited to the embodiments that are described above, and various types of modifications can be made. In the embodiments that are described above, the numbering character strings are made up of pluralities of numerals, but the numbering character strings are not limited to using numerals. The numbering character string needs only to include at least one character that has a regularity that makes it possible for it to be repeatedly updated in a specified order. In the embodiments that are described above, the priority levels are set to the three levels of "highest priority", "next highest priority", and "no priority", but the number of the priority levels may also be two levels or more than three levels. The priority levels may also be expressed in the form of numerals, such as 1 to 5, for example.

In the first embodiment, the numbering is performed in increments of "1", and in the second embodiment, the numbering is performed in increments of "2", but the update quantity p can also be modified as desired in any one round of the numbering. For example, in a case where the numbering character string that is contained in the content is "5A" and the update quantity p is "5", then in the numbered printing processing (FIG. 5), the lowest-order character is updated by advancing it by five characters in alphabetical order in one round of the numbering. That is, the content is successively updated as "5A", "5F", "5K", "5P", and the like. In a case where the lowest-order character reverts to "A" from "Z" (that is, in a case where character rollover occurs), the numeral that is the highest-order character is incremented by "1".

The present disclosure is not limited to the tape printer 1 and can also be applied to a device that is configured to create printable data from content that contains characters that have a specified order. For example, the numbered printing processing (FIG. 5 or FIG. 8) may also be performed by a personal computer, based on an editing program for editing content. In that case, image data of the content in which the characters have been updated may be created as the printable data for the content at Step S1.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A data creation device, comprising:

a processor; and memory storing computer-readable instructions that, when executed by the processor, cause the data creation device to perform steps of:

specifying, as an update field, from among a plurality of fields that have been defined in content that is stored in the data creation device, a field for which a first priority level that has been set is a same level as a second priority level stored in the data creation device, wherein each of the plurality of fields contains at least one character, the at least one character being part of a predefined set of characters, the predefined set of characters being arranged in a specified order and having a first character value and a last character value in the specified order, the first priority level being set for each one of the plurality of fields, updating the at least one character that is contained in the update field from a current character value to another character value, the another character value being determined by advancing the current character value in the specified order of the predefined set of characters, lowering a level of the stored second priority level by one level, in a case where a character rollover has occurred during the updating of the at least one character, the character rollover being a reversion of the at least one character from the last character value to the first character value in the specified order, and creating printable data for the content in which the at least one character has been updated, in a case where the character rollover has not occurred during the updating of the at least one character, wherein the computer-readable instructions, when executed, cause the data creation device to perform the specifying of the update field every time the stored second priority level is lowered.

2. The data creation device according to claim 1, wherein the updating of the at least one character includes updating the at least one character that is contained in each of a plurality of update fields, wherein the plurality of update fields are specified as at least two fields, of the plurality of fields, for which the first priority level is the same level as the second priority level.

3. The data creation device according to claim 1, wherein the updating of the at least one character includes updating the at least one character of each field, of the plurality of fields, for which the first priority level is a lower level than an initial level of the second priority level and equal to the second priority level currently stored, the initial level of the second priority level being set depending on a number of times that the character rollover occurred during a previous updating of the at least one character of one or more fields, of the plurality of fields, for which the first priority level was one level higher than the second priority level that is currently stored.

4. The data creation device according to claim 1, wherein the plurality of fields includes at least one non-updateable field for which the updating of the at least one character contained in the non-updateable field is prohibited.

5. The data creation device according to claim 1, wherein the computer-readable instructions, when executed by the processor, further cause the data creation device to perform steps of:

updating the stored second priority level to an initial level, in a case where the printable data has been created; and specifying the update field every time the stored second priority level is updated to the initial level.

6. A non-transitory computer-readable medium storing a data creation program that includes computer-readable instructions to be executed by a processor of a computing device, wherein the computer-readable instructions, when executed, cause the computing device to perform steps of:

specifying as an update field, from among a plurality of fields that have been defined in content stored in the computing device, a field for which a first priority level that has been set is a same level as a second priority level stored in the computing device, wherein each of the plurality of fields contains at least one character, the at least one character being part of a predefined set of characters, the predefined set of characters being arranged in a specified order and having a first character value and a last character value in the specified order, the first priority level being set for each one of the plurality of fields, updating the at least one character contained in the update field from a current character value to another character value, the another character value being determined by advancing the current character value by a specific amount in the specified order, lowering a level of the stored second priority level by one level, in a case where a character rollover has occurred during the updating of the at least one character, the character rollover being a reversion of the at least one character from the last character value to the first character value in the specified order, and creating printable data for the content in which the at least one character has been updated, in a case where the character rollover has not occurred during the updating of the at least one character, wherein the computer-readable instructions cause the computing device to perform the specifying of the update field every time the stored second priority level is lowered.

7. The non-transitory computer-readable medium according to claim 6, wherein the updating of the at least one character includes updating the at least one character contained in each of a plurality of update fields, the plurality of update fields being specified as at least two fields, of the plurality of fields, for which the first priority level is the same level as the second priority level.

8. The non-transitory computer-readable medium according to claim 6, wherein the updating of the at least one character includes updating the at least one character of each field, of the plurality of fields, for which the first priority level is a lower level than an initial level of the second priority level and equal to the second priority level currently stored, the initial level of the second priority level being set depending on a number of times that the character rollover occurred during a previous updating of the at least one character of one or more fields, of the plurality of fields, for which the first priority level was one level higher than the second priority level that is currently stored.

9. The non-transitory computer-readable medium according to claim 6, wherein the plurality of fields includes at least one non-updateable field for which the updating of the at least one character contained in the non-updateable field is prohibited.

10. The non-transitory computer-readable medium according to claim 6, wherein the data creation program further includes computer-readable instructions that cause the computing device to perform steps of:

updating the stored second priority level to an initial level, in a case where the printable data has been created; and specifying the update field every time the stored second priority level is updated to the initial level.

* * * * *